United States Patent [19]

Nepela et al.

[11] 4,098,605
[45] Jul. 4, 1978

[54] FERROMAGNETIC PALLADIUM ALLOYS

[75] Inventors: Daniel Andrew Nepela, Saratoga; Donald Winston Rice, San Jose; James Carr Suits, Saratoga, all of Calif.

[73] Assignee: International Business Machines Corporation, Armonk, N.Y.

[21] Appl. No.: 736,601

[22] Filed: Nov. 18, 1976

[51] Int. Cl.² ............... C22C 38/08; C22C 5/04; C22C 19/03

[52] U.S. Cl. ............... 75/122; 75/123 K; 75/123 R; 75/134 F; 75/170; 75/172 R; 148/31.55; 428/928

[58] Field of Search ......... 75/172 R, 122, 134 N, 75/134 F, 123 K, 123 R, 170; 148/101, 108, 31.55; 428/928

[56] References Cited

U.S. PATENT DOCUMENTS

| | | | |
|---|---|---|---|
| 1,832,307 | 11/1931 | Kingsbury | 75/172 R |
| 2,159,809 | 5/1939 | Lenz et al. | 75/172 R |
| 2,815,282 | 12/1957 | Rhodes et al. | 75/172 R |
| 3,140,941 | 7/1964 | Walter | 75/122 R |
| 3,409,479 | 11/1968 | Greenberg et al. | 148/108 |
| 3,497,332 | 2/1970 | Donnelly et al. | 75/172 R |
| 3,607,460 | 9/1971 | Lommel | 148/31.55 |

FOREIGN PATENT DOCUMENTS 1,125,690  8/1968  United Kingdom ............ 148/101

Primary Examiner—Arthur J. Steiner
Attorney, Agent, or Firm—Joseph E. Kieninger

[57] ABSTRACT

Ferromagnetic alloys containing palladium suitable for use in magnetic devices and having improved resistance to corrosion contain from about 20 to 65 atomic percent to 80 atomic percent iron and 0 to 55 atomic percent nickel. Magnetic films made of these alloys which contain 20 to 65 atomic percent palladium exhibit a magnetization, $4\pi M$, and a corrosion resistance equal to or better than Permalloy.

3 Claims, 3 Drawing Figures

FERROMAGNETIC PALLADIUM ALLOYS

FIELD OF THE INVENTION

This invention relates to ferromagnetic compositions and more particularly to magnetic films containing palladium.

BRIEF DESCRIPTION OF PRIOR ART

Magnetic thin films of Permalloy containing about 80% nickel and 20% iron are finding wide application as computer storage elements and in bubble domain devices. In certain of these applications areas it has been determined that the Permalloy thin films require additional protection against atmosphric corrosion.

The addition of a third metal to Permalloy has been widely investigated in order to alter the properties thereof. The patent to Griest et al., United Kingdom Pat. No. 1,125,690 and assigned to the assignee of the present application discloses the addition of 1 to 12 atomic percent palladium to Permalloy to obtain a film with zero magnetostriction. These compositions have less resistance to corrosion than Permalloy.

The work of E. M. Bradley published in the Journal of Applied Physics, supplement to Volume 33 (March 1962) pp. 1051–1057, discloses the properties of nickel-iron-cobalt films. The nickel-iron-cobalt films compared to the films of simple binary Permalloy show higher values of wall motion coercive force and anisotropy field.

The work of Rice, Suits and Lewis published in the Journal of the Applied Physics, Vol. 47, No. 3, march 1976, pp. 1158–1163 entitled "Magnetic, Corrosion, and Surface Properties of Ni-Fe-Cr Thin Films", describes the corrosion, surface and magnetic properties of Permalloy films containing chromium therein. While chromium did reduce the corrosion of Permalloy type alloys, the magnetization and the magnetoresistance of the resultant alloy were reduced rapidly.

In Chapter XI, pages 569–573, of Magnetism and Metallurgy, Volume 2, 1969 published by Academic Press, Kouvel describes the magnetic and crystallographic properties of Fe-Pd and Fe-Pt alloys. The similarity of the Curie point and the saturation magnetization of these two alloys are discussed in detail. This article does not suggest or teach any particular alloy compositions which could be used commercially to replace Permalloy. In addition, the article does not discuss the corrosion characteristics of these alloys.

On pages 411 and 412 in the book entitled "Ferromagnetism" by Bozorth, Fourth Printing published by D. VanNostrand Company, Princeton, N.J., the magnetic properties of Fe-Pd alloys are also discussed.

SUMMARY OF THE INVENTION

It is the primary object of this invention to provide an improved alloy.

It is another object of this invention to provide a ferromagnetic alloy having improved corrosion resistance.

It is still another object of this invention to provide a corrosion resistant alloy having suitable magnetic properties for use in bubble domain devices.

It is yet still another object of this invention to provide a corrosion resistant alloy having magnetic properties suitable for use in thin film inductive heads, and thin film magnetoresistance heads for sensing magnetic disks, credit cards and other applications.

These and other objects are accomplished by an alloy having the following composition:

$$Ni_{100-x-y}Fe_yPd_x$$

where
x = 20 to 65 atomic percent
y = the lower limit is a value along line AB in FIG. 1 (25 to 35%) and the upper limit is 80 atomic percent A preferred embodiment contains 35% Pd, 60% Fe, and 5% Ni. Another preferred embodiment contains 40% Pd and 60% Fe. These compositions are more resistant to corrosion and have a higher magnetization, $4\pi M$, value than Permalloy.

Other objects of this invention will be apparent from the detailed description wherein various embodiments of the invention are described.

IN THE DRAWINGS

DESCRIPTION OF THE ILLUSTRATIVE EMBODIMENTS

The addition of 20 to 65 atomic percent palladium to nickel-iron Permalloy type compositions increases the corrosion resistance of these compounds substantially. At the same time, the magnetic properties of these compositions such as the magnetism, $4\pi M$, and magnetoresistance change relatively slowly with palladium addition. The concentration of the palladium and the iron can be such that the nickel portion of the alloy can be eliminated thereby resulting in a binary alloy of FePd rather than a ternary alloy of NiFePd. Prior to this invention, these binary alloys have never been shown to exhibit corrosion resistant properties nor have they been considered to be useful in thin film induction heads, magnetic bubble devices, or thin film magnetoresistant heads for sensing magnetic disks, credit cards and other magnetoresistant applications.

Figure 1:
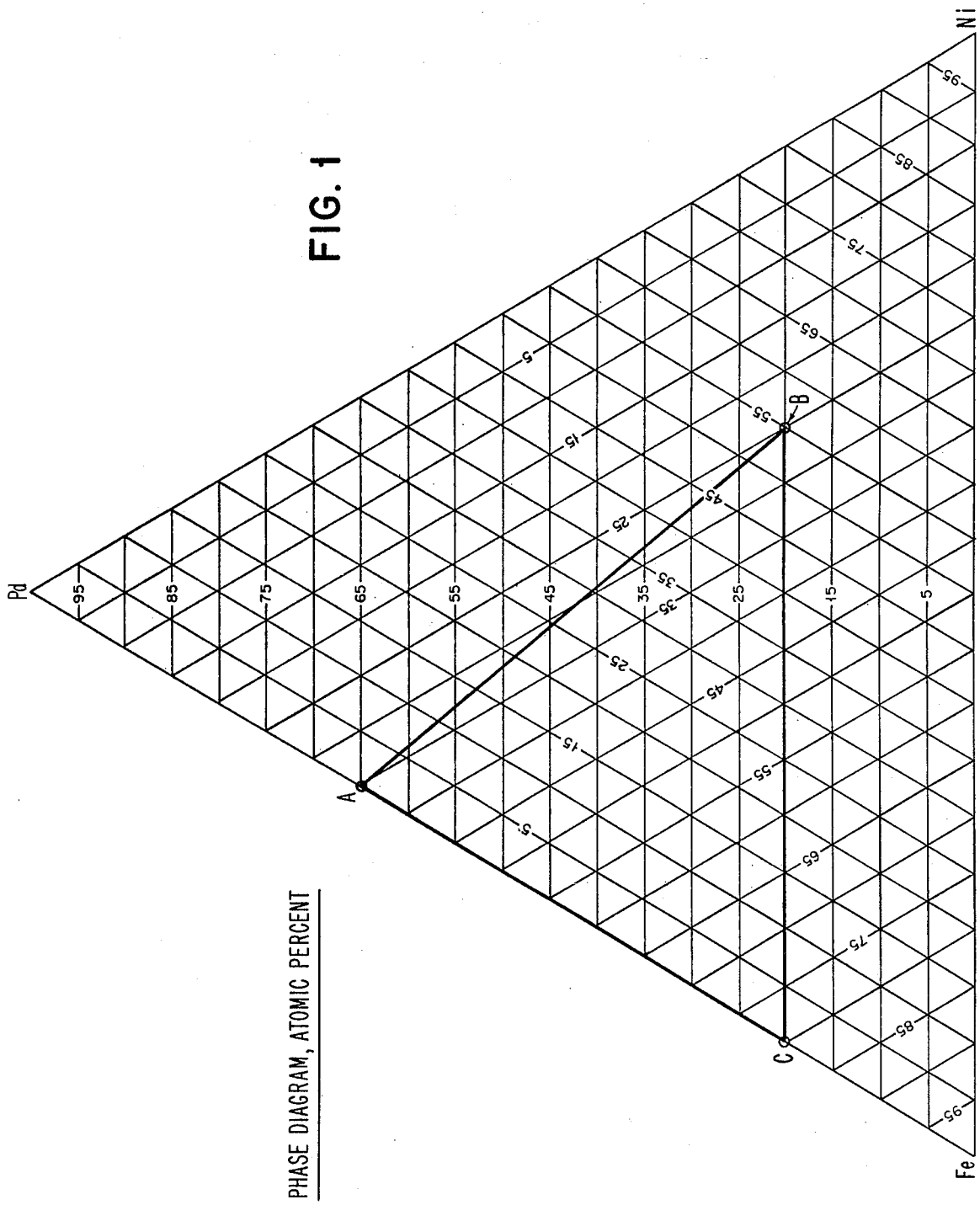
FIG. 1 is a ternary diagram showing diagrammatically the range of palladium, iron and nickel contemplated in the present invention.

As shown in ternary diagram set forth in FIG. 1, the compositions covered in accordance with this invention are in the sectioned region defined by the lines connecting points A (65% Pd, 35% Fe), B (20% Pd, 25% Fe, 55% Ni) and C (20% Pd, 80% Fe). The compositions are defined by the formula $Ni_{100-x-y}Fe_yPd_x$ where
x = 20 to 65 atomic percent
y = the lower limit is a value along the line AB in FIG. 1 (25 to 35%) and the upper limit is 80 atomic percent.

A preferred composition range in the binary alloy is $Fe_{65\ to\ 55\%}Pd_{35\ to\ 45\%}$. A preferred composition in the ternary alloy is $Fe_{50\ to\ 70\%}$ and $Ni_{0.1\ to\ 10}$.

The nickel-iron palladium thin films may be prepared by simultaneous evaporation from a two source system. One source is a resistance heated berylia crucible containing a nickel-iron ingot. The second source is an electron beam gun source containing an ingot of paladium. During deposition of the new alloy, the vacuum is typically in the range of $10^{-5}$ to $10^{-7}$ Torr. The deposition rate is about 180 angstroms per minute and the substrate temperature is about 200° C. The films can be deposited on fused quartz or float glass substrates. The film thickness may vary from 300 to 20,000 angstroms. The thickness of the film will depend upon the intended application. All of the data shown in FIGS. 2 and 3 were taken on films made by vapor deposition. Some film properties such as the coercive force are sensitive to preparation conditions. Tests have shown that substrate temperature is an important parameter in the vapor deposition process. Generally, the required substrate temperature is known to be greater than 60° C and less than 450° C with the preferred temperature being 200° C. Films with satisfactory properties in the composition range defined by this invention may also be prepared by sputtering.

Figure 2:
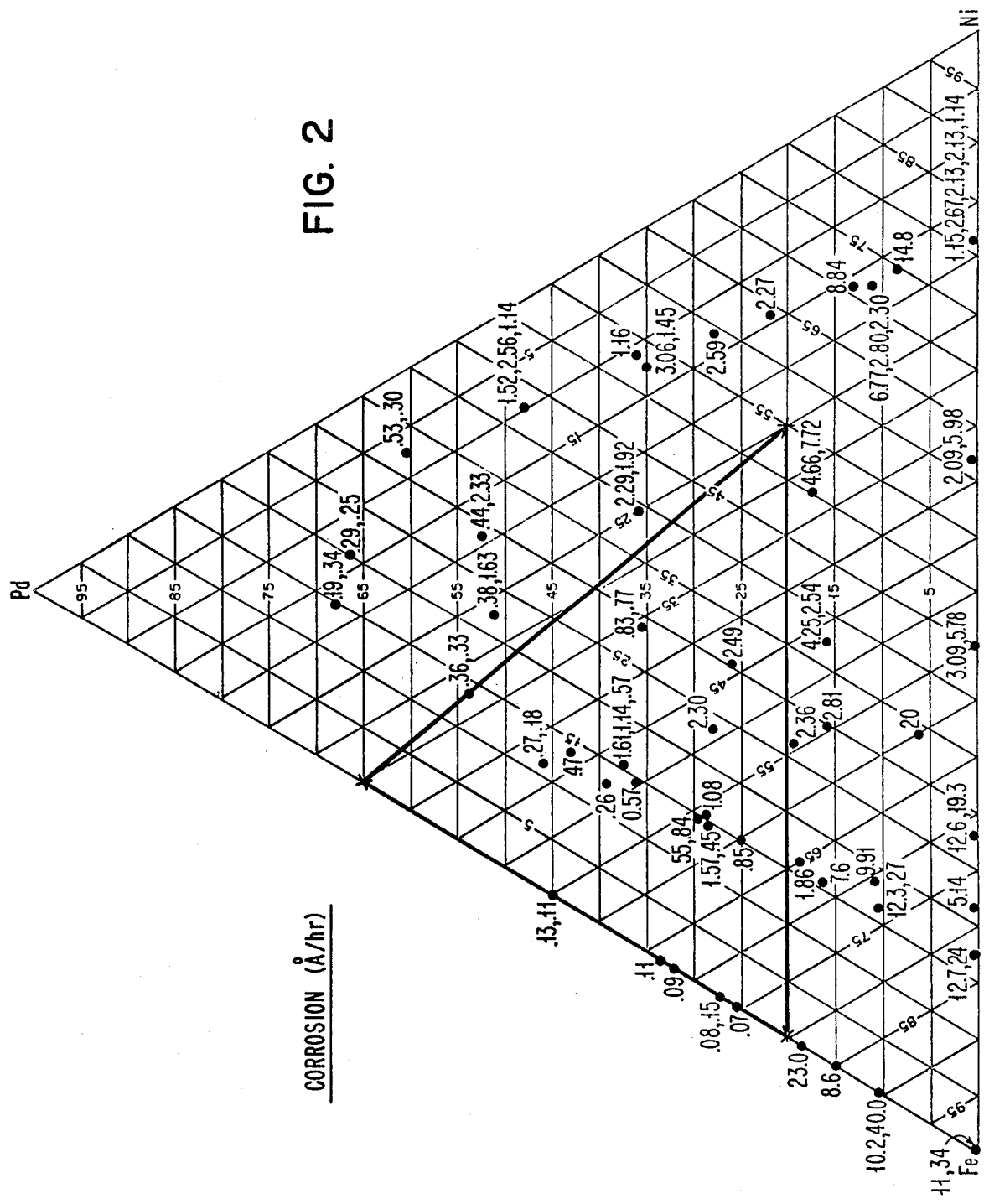
FIG. 2 is a ternary diagram illustrating corrosion data for a number of compositions.

Corrosion data on compositions outside of and within the composition range defined by this invention are shown in FIG. 2. The corrosion of Permalloy (80% Ni, 20% Fe) in A°/hour was 1.14, 1.15, 2.13 and 2.33 for an average value of 1.69. As shown in FIG. 2, it was necessry to have at least 20% palladium in the alloy in order to reduce the corrosion to a value below that obtained for Permalloy. Multiple numbers indicate multiple tests on that composition.

The corrosion test consisted of exposing films of the alloys to an atmospheric test known to accelerate the decay of transition metals. The particular test conditions used were:
  70% Relative Humidity
  25.0° C Temperature
  510 ppb $NO_2$
  310 ppb $SO_2$
  15 ppb $H_2S$
  3 ppb $Cl_2$
  170 ppb $O_3$
  Balance purified air The "in situ" resistance change with time of the film was used as a measure of its corrosion rate. This rate was calculated in angstroms(A) of film lost per hour of exposure time.

Figure 3:
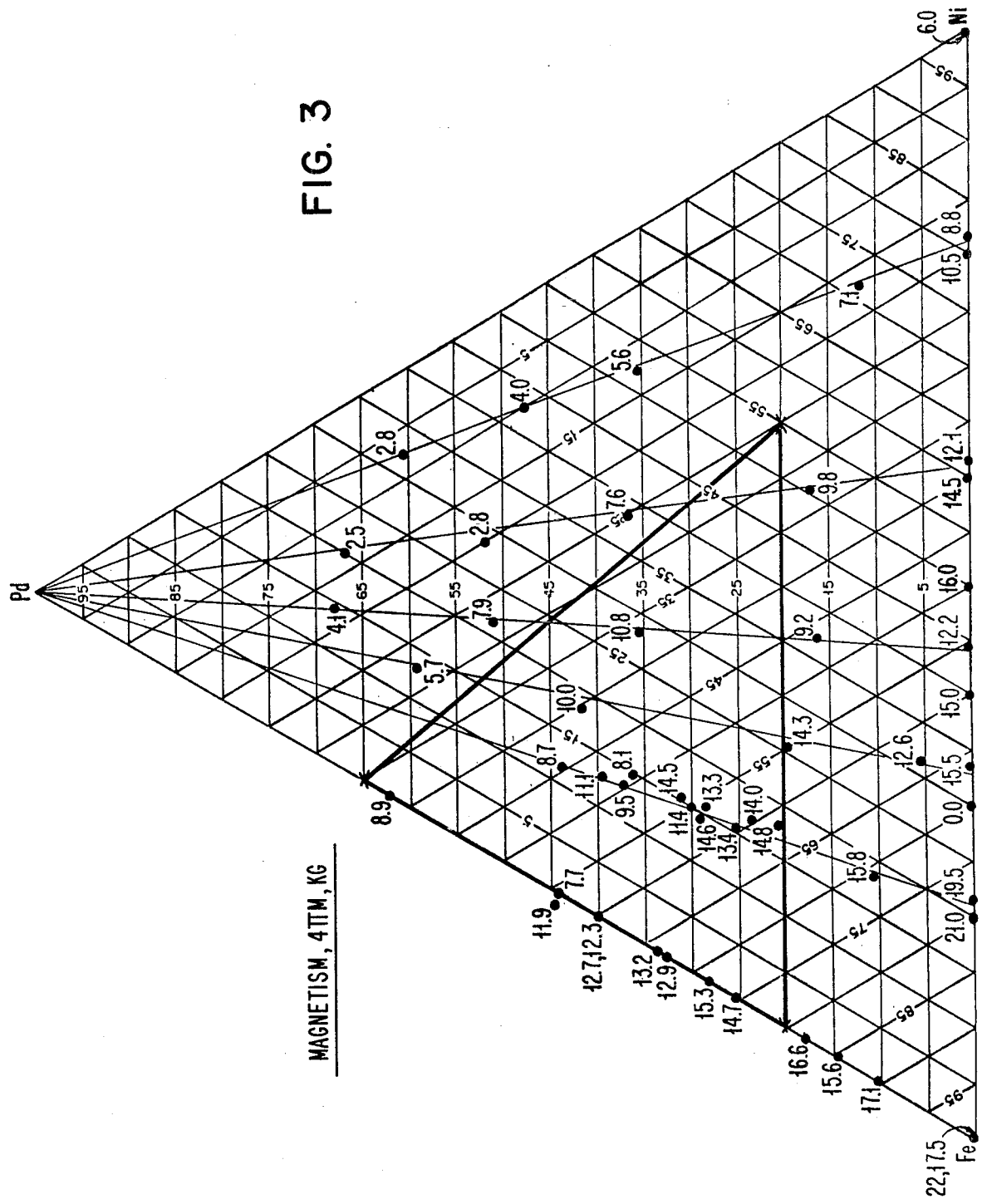
FIG. 3 is a ternary diagram illustrating $4\pi M$ magnetization data for a number of compositions.

Magnetization, $4\pi M$, data on compositions outside and within the composition range defined by this invention are shown in FIG. 3. The $4\pi M$ of Permalloy in KG was 10.5 and 8.8 for an average value of 9.6. As shown in FIG. 3, it is necessary to have a minimum of between 25 and 35% iron in the alloy in order to have a $4\pi M$ value as high or higher than that obtained for Permalloy.

Magnetoresistance, $\Delta\rho/\rho$, has been measured on a series of binary PdFe and ternary NiPdFe alloys in the claimed composition range. Some of the alloys showed $\Delta\rho/\rho$ values of 0.5 to 0.9% which is suitable for sensing magnetization changes in certain applications.

Although preferred embodiments have been described, it is understood that numerous variations may be made in accordance with the principles of this invention.

We claim:
1. An improved corrosion resistant ferromagnetic film composition containing palladium adapted to provide a magnetization ($4\pi M$) of at least about 9.61 KG and a corrosion rate of not more than about 1.7 A°/hour consisting essentially of:

$$Ni_zFe_yPd_x$$

where
  $x$ = 20 to 65 atomic percent
  $y$ = the lower limit is a value along line AB in FIG. 1 (25 to 35%) and the upper limit is 80 atomic percent.
  $z$ = 0.1 to 55 atomic percent
  $x+y \leq 99.9$ atomic percent.
2. A composition as described in claim 1 wherein:
  $x$ = 20 to 50 atomic percent
  $y$ = 50 to 70 atomic percent
  $z$ = 0.1 to 30 atomic percent.
3. A composition as described in claim 1 wherein:
  $x$ = 20 to 50 atomic percent
  $y$ = 50 to 70 atomic percent
  $z$ = 0.1 to 10 atomic percent.

* * * * *